(12) United States Patent
Childress et al.

(10) Patent No.: US 8,026,930 B2
(45) Date of Patent: Sep. 27, 2011

(54) PREVENTING VIEWING BY BYSTANDERS OF INFORMATION ON A DISPLAY SCREEN

(75) Inventors: Rhonda L. Childress, Austin, TX (US); Lorraine M. Herger, Port Chester, NY (US); David B. Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1049 days.

(21) Appl. No.: 11/834,178

(22) Filed: Aug. 6, 2007

(65) Prior Publication Data
US 2009/0040236 A1 Feb. 12, 2009

(51) Int. Cl.
*G09G 5/00* (2006.01)
(52) U.S. Cl. ......... 345/629; 345/427; 715/768; 359/463
(58) Field of Classification Search ............... 345/629; 715/768; 359/463
See application file for complete search history.

(56) References Cited

U.S. PATENT DOCUMENTS

| | | | | |
|---|---|---|---|---|
| 4,373,730 A | | 2/1983 | Koltz | |
| 4,879,603 A | * | 11/1989 | Berman | 348/832 |
| 5,107,443 A | * | 4/1992 | Smith et al. | 715/751 |
| 5,537,476 A | * | 7/1996 | Coteus et al. | 380/54 |
| 5,614,920 A | * | 3/1997 | Coteus et al. | 345/7 |
| 5,619,219 A | * | 4/1997 | Coteus et al. | 345/7 |
| 5,793,470 A | * | 8/1998 | Haseltine et al. | 353/20 |
| 6,504,649 B1 | * | 1/2003 | Myers | 359/454 |
| 6,630,896 B1 | | 10/2003 | Nathan | |
| 6,668,325 B1 | | 12/2003 | Collberg et al. | |
| 7,191,338 B2 | * | 3/2007 | Stern et al. | 713/183 |
| 7,230,621 B2 | * | 6/2007 | Adams, Jr. | 345/427 |
| 7,559,021 B2 | * | 7/2009 | Chen et al. | 715/243 |
| 2003/0025667 A1 | * | 2/2003 | Yerazunis et al. | 345/102 |
| 2003/0026449 A1 | * | 2/2003 | Yerazunis et al. | 382/100 |
| 2006/0129948 A1 | * | 6/2006 | Hamzy et al. | 715/790 |
| 2006/0190839 A1 | * | 8/2006 | Ben-Shachar et al. | 715/781 |
| 2006/0218493 A1 | * | 9/2006 | Murray | 715/526 |
| 2007/0226647 A1 | * | 9/2007 | Louch | 715/788 |
| 2008/0025645 A1 | * | 1/2008 | Jakobson et al. | 382/300 |

OTHER PUBLICATIONS

Dragovic, B. et al, Information Exposure Control Through Data Manipulation for Ubiquitous Computing, 2005, ACM Digital Library.
Bimber, O. et al, Modern Approaches to Augmented Reality, 2005, ACM Digital Library.

* cited by examiner

*Primary Examiner* — M Good Johnson
(74) *Attorney, Agent, or Firm* — Dillon & Yudell LLP (57) ABSTRACT

A method of and system for preventing viewing by bystanders of information displayed on a display screen displays simultaneously an active image and a second image. The display screen has a first viewing angle and a second viewing angle. The first image is visible from the first viewing angle and invisible from said second viewing angle. The obfuscating image is invisible from the first viewing and visible from the second viewing angle. The system simultaneously manipulates the first and obfuscating images in response to input by a user.

7 Claims, 8 Drawing Sheets

PREVENTING VIEWING BY BYSTANDERS OF INFORMATION ON A DISPLAY SCREEN

BACKGROUND OF THE INVENTION

1. Technical Field

The present invention relates in general to the field of displaying and manipulating of information on a computer display screen, and more particularly to a method of and system for preventing the viewing by bystanders of information displayed and manipulated on a computer display screen.

2. Description of the Related Art

Mobile or portable computing devices, such as laptop and notebook computers, have enabled people to do work on their computers away from their offices. People can do work in private places, such is their homes and hotel rooms. People can also do work in public places, such as coffee shops, libraries, airports, and on airplanes. People often display and/or create private, confidential, sensitive, or other non-public information on their mobile computers. In public places, bystanders may be able to view the information displayed on a portable computer.

Limited viewing angle display screens have been developed for portable computers. Such display screens make it difficult for a bystander to see what is displayed on the screen. However, the inability to see what is displayed makes some bystanders curious as to what is so secret. Those bystanders may be inclined to move or reposition themselves so that they can get a better view of the display screen.

SUMMARY OF THE INVENTION

The present invention provides a method of and system for preventing viewing by bystanders of information displayed on a display screen. An embodiment of a system according to the present invention simultaneously displays on a display screen a first image and a second image. The display screen has a first viewing angle and a second viewing angle. The first image is visible from the first viewing angle and invisible from said second viewing angle. The second image is invisible from the first viewing and visible from the second viewing angle. The system receives user input directed to the first image. The system executes the result of the user input on the first image. The system simultaneously manipulates the second images in response to input by a user.

The first image is visible to the user but invisible to a bystander. The second image is visible to the bystander but invisible to the user. The first image includes in information with which the user is working. Since the bystander sees what appears to be an active image, the bystander's curiosity is not aroused about what the user is working on. Being able to see what appears to be what the user is viewing satisfies the bystander's curiosity and preserves the privacy of the user.

In one embodiment of the present invention, the display screen comprises a display panel and a lenticular lens overlaying the display panel. The system interlaces the first and second images and displays the interlaced first and second images on the display panel under the lenticular lens.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
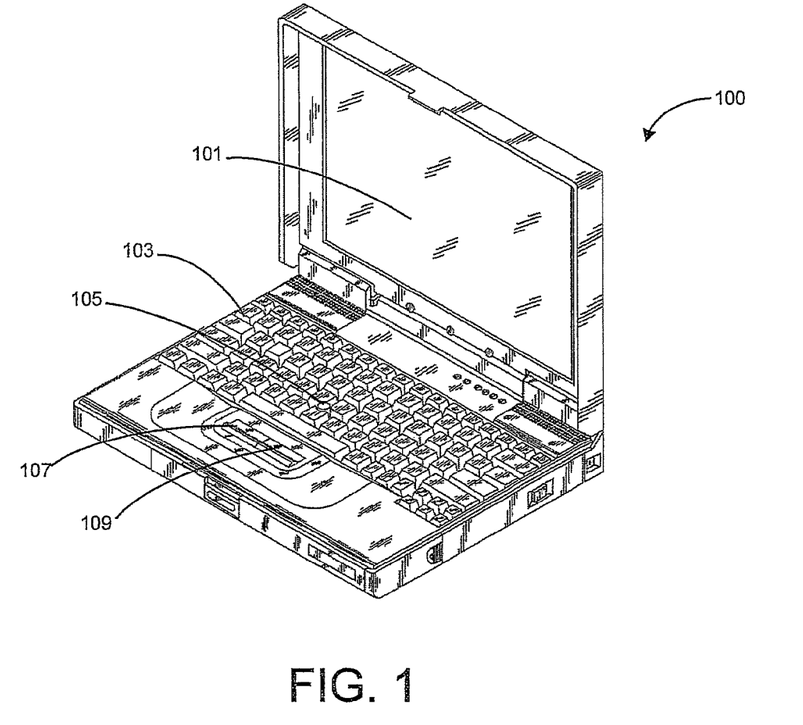
FIG. 1 is a perspective view of an embodiment of a notebook computer according to the present invention.

Referring now to drawings, and first to FIG. 1, a system according to the present invention includes a computer 100. The system of the present invention is applicable to mobile computers. Accordingly, computer 100 is preferably a laptop or notebook computer. Computer 100 includes a display screen 101. As will be explained in detail hereinafter, displace screen 101 provides a first viewing angle and a second viewing angle so that images that are visible from the first viewing angle are not visible from the second viewing angle. Conversely, images that are visible from the second viewing angle are not visible from the first viewing angle. Display screen 101 may include a liquid crystal display, plasma display, or other display technology.

Computer 100 includes user input devices, including a keyboard 103 and a pointing device 105. Computer 100 includes a mouse buttons 107 and 109. Keyboard 103 preferably includes the keys of a standard keyboard, including alphanumeric keys, up, down, left and right keys, page up and page down keys, and the like. A pointing device 105 is used to move a pointer about display screen 101. Mouse buttons 107 and 109 are used in conjunction with the pointing device 105 to interact with objects displayed on display screen 101.

Figure 2:
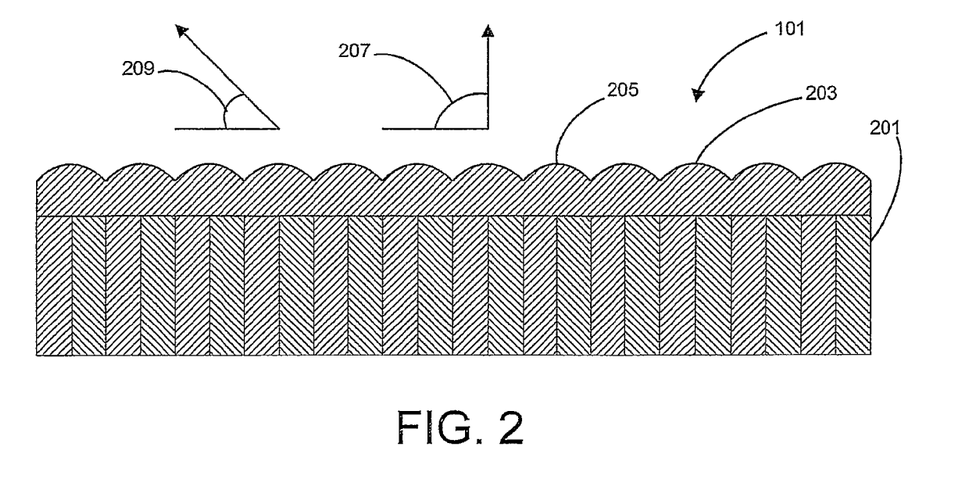
FIG. 2 is a detail sectional view of an embodiment of an interlaced display and overlay according to the present invention.

FIG. 2 illustrates a detail sectional view of a portion of display screen 101. Display screen 101 includes a display panel 201, which may be a liquid crystal display panel, a plasma display panel, or other display panel. Display panel 201 is overlaid by a lenticular lens 203. As is well-known to those skilled in the art, lenticular lens 203 includes a plurality of parallel convex linear lenses 205. A common use of lenticular lenses is in making lenticular prints for producing 3-D, moving, or shifting images from 2-D images. In embodiments of the present invention, lenses 205 are oriented vertically on display screen 101. According to the present invention, lenticular lens 203 provides a first viewing angle 207 and a second viewing angle 209. Two separate images are interlaced and displayed on display panel 201. One image is visible from first viewing angle 207 but is invisible from second viewing angle 209. The other image is visible from second viewing angle 209 but invisible from first viewing angle 207. It should be recognized that the combination of the flat panel display and lenticular lens is only one example of a system that provides multiple viewing angles. Other examples include screens having corrugated prismatic surfaces and screens including a Venetian blind-like arrangement.

Figure 3:
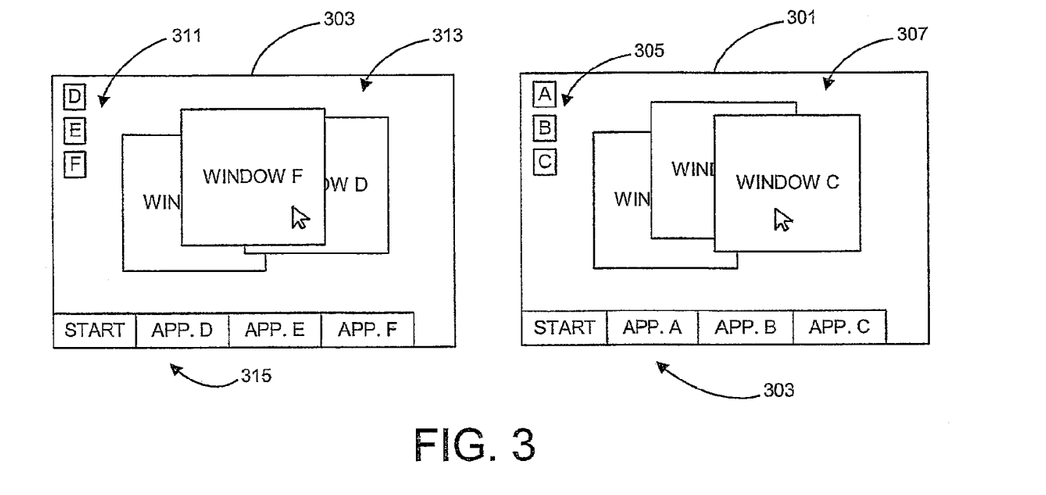
FIG. 3 illustrates an embodiment of an active desktop and an obfuscating desktop according to the present invention.

FIG. 3 illustrates examples of embodiments of an active desktop 301 and an obfuscating desktop 303. Active desktop 301 provides a first image according to the present invention while obfuscating desktop 303 provides a second image according to the present invention. Both active desktop 301 and obfuscating desktop 303 are standard windowed desktops well known to those skilled in the art of graphical user interfaces. Active desktop 301 may include a plurality of icons 305, windows 307, and buttons 309. Similarly, obfuscating desktop three or nine may include a plurality of icons 311, windows 313, and buttons 315. Active desktop 301 and obfuscating desktop 303 are interlaced with each other in the manner described with respect to FIG. 2.

According to the present invention, active desktop 301 is visible to the user of the computer from first viewing angle 207 of FIG. 2. Active desktop 301, and the objects displayed thereon, receive input from, and provide information to, the user. Obfuscating desktop 303 is visible to a bystander. Objects and images displayed on obfuscating desktop 303 move or change in response to input from the user.

Figure 4:
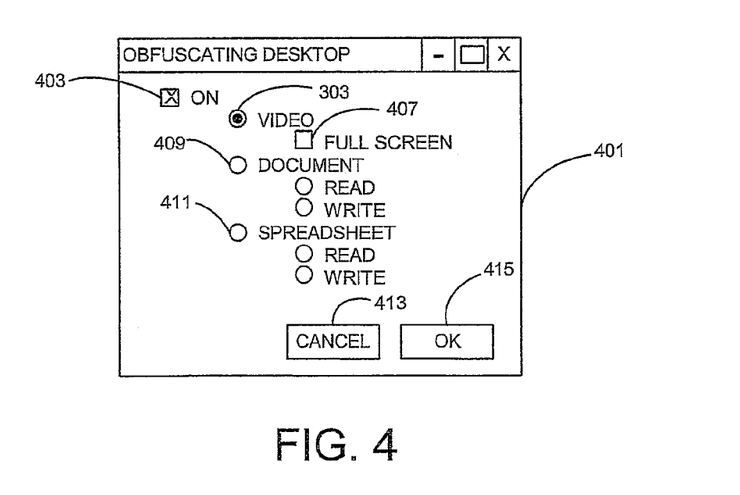
FIG. 4 illustrates an embodiment of an obfuscating desktop control according to the present invention.

FIG. 4 illustrates an example of an obfuscating desktop control 401. Obfuscating desktop control 401 may be displayed on active desktop 301 and operated by a user to control what is displayed on obfuscating desktop 303 and how what is displayed on obfuscating desktop 303 responds to user input. Obfuscating desktop control 401 includes an on checkbox 403. When on checkbox 403 is checked, content on obfuscating desktop 303 is displayed and animated according to the desires of the user. Obfuscating desktop control 401 includes various controls so that the user can select what and how information is displayed in the focused window of obfuscating desktop 303. For example, obfuscating desktop control 401 includes a video radio button 405. When video radio button 405 is selected, a video is displayed in the focused window of obfuscating desktop 303. A full screen checkbox 407 is provided so that a full-screen version of the video may be displayed on obfuscating desktop 303. Obfuscating desktop control 401 includes a document radio button 409, which enables the user to display a document in the focused window of obfuscating desktop 303. The document may be presented as a read-only document or a write document. When the document is read-only, the document responds to scroll and page commands. When the document is in write format, a script may be run so that the document appears to be presenting keystrokes input by the user. In write format, a bystander would see characters appear on the up the skating desktop in response to keyboard input from the user. Obfuscating control for one includes a spreadsheet radio button 411 that causes a spreadsheet to be displayed in the focused window of obfuscating desktop 303. As described with respect to document radio button 409, the spreadsheet may be presented in write or read only format. Obfuscating desktop control 401 includes a cancel button 413 and an OK button 415.

Figure 5:
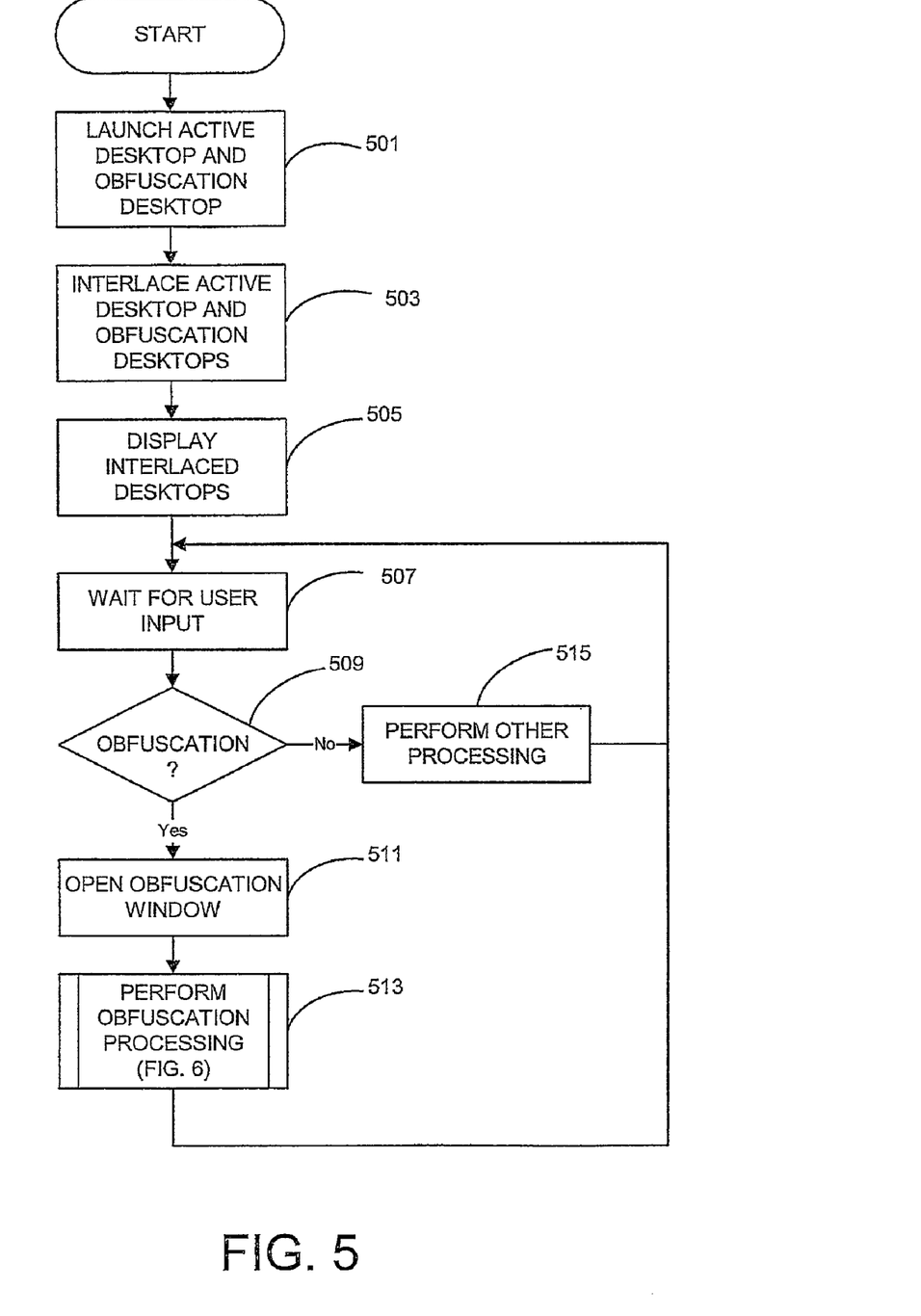
FIG. 5 is a flow chart of an embodiment of active desktop and obfuscation desktop launch processing according to the present invention.

FIG. 5 is a high-level flowchart of an embodiment of processing according to the present invention. The system launches the active desktop and the obfuscation desktop at block 501. The system interlaces the active desktop and the obfuscation desktop at block 503. Then, the system displays the interlaced desktops, at block 505, and waits for user input at block 507. If, as determined at decision block 509, the user input is obfuscation, the system opens the obfuscation control, at block 511, and performs obfuscation processing, indicated generally at block 513, and described in detail with reference to FIG. 6. If, as determined at decision block 509, the user input is not obfuscation, the system performs other processing, as indicated generally at block 515.

Figure 6:
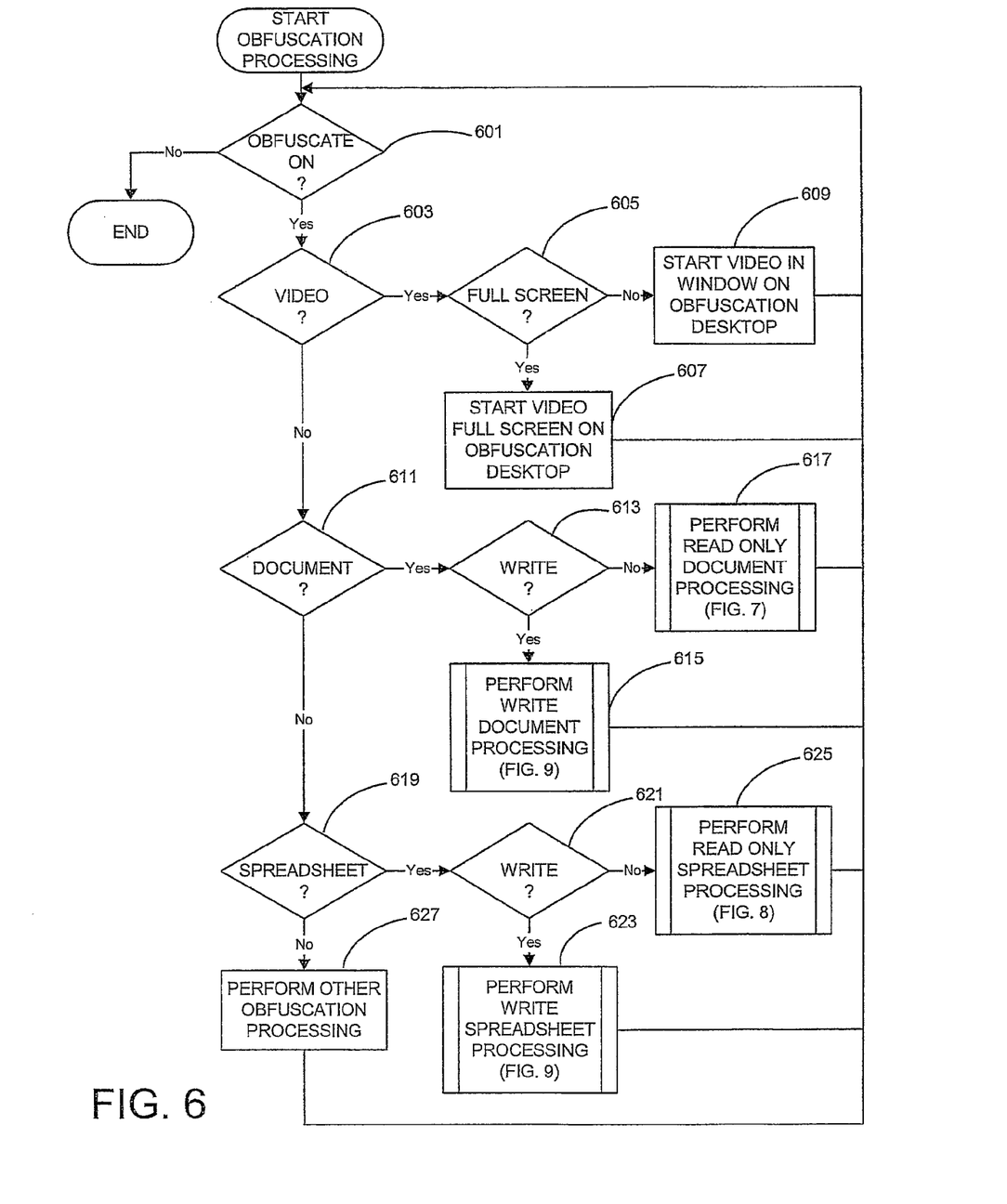
FIG. 6 is a flow chart of an embodiment of active desktop and obfuscation processing according to the present invention.

FIG. 6 is a high-level flowchart of an embodiment of obfuscation processing, indicated generally at block 513 of FIG. 5. The system determines, at decision block 601, if obfuscation is on. If not, obfuscation processing ends. If obfuscation is determined to be on, the system determines, at decision block 603 if the user has selected video. If so, the system determines, at decision block 605, if the user has selected full-screen. If so, the system starts a video full-screen on the obfuscation desktop, as indicated at block 607. If the user has not selected full-screen, the system starts a video in a window on the obfuscation desktop, at block 609. If, as determined at decision block 611, the user has selected document, the system determines, at decision block 613, if the user has selected to have the document presented in write mode. If so, the system performs quite document processing, as indicated generally at block 615 and as shown in detail with reference to FIG. 9. If, as determined at decision block 613, the user has not selected document to be displayed in write mode, the system performs read-only document processing, as indicated generally at block 617 and described in detail with reference to FIG. 7. If, as determined at decision block 619, the user has selected spreadsheet, the system determines, at decision block 621, if the user has selected right. If so, the system performs quite spreadsheet processing, as indicated generally at block 623 and described in detail with to reference to FIG. 9. If the user has not selected write processing, the system performs read-only spreadsheet processing, as indicated generally at block 625 and described in detail with reference to FIG. 8. If, at decision block 619, the user has not selected spreadsheet, the system performs other obfuscation processing, at block 627.

Figure 7:
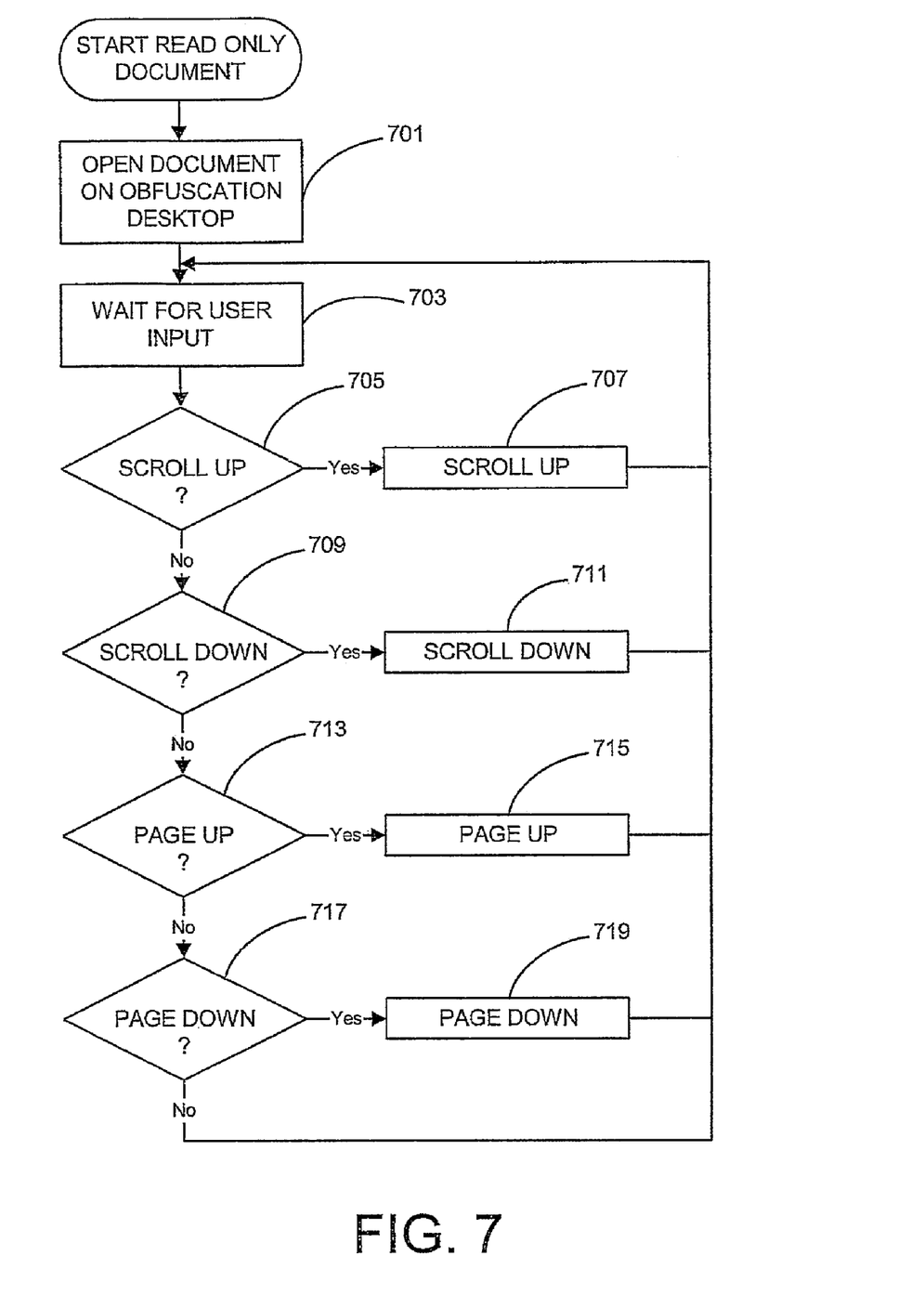
FIG. 7 is a flow chart of an embodiment of read only obfuscation document processing according to the present invention.

FIG. 7 is a flow chart of read-only processing according to the present invention. The system the system opens a document on the obfuscation desktop, at block 701, and waits for user input at block 703. It will be recalled that the user input is intended to operate on objects displayed on active desktop 301 of FIG. 3. However, according to the present invention, the system watches the user input and apply certain actions to objects displayed on obfuscating desktop 303 of FIG. 3. If, as determined at decision block 705, the user input is scroll up, the system scrolls up the document displayed on the obfuscating desktop, at block 707. As is known to those skilled in the art, a document may be scroll using arrow keys on a keyboard 103 of FIG. 1 or using a pointer and mouse buttons on a graphical scroll control. If, as determined at decision block 709, the user input is scroll down, the system scrolls down the document displayed on the obfuscation desktop, as indicated at block 711. If, as determined at decision block 713, the user input is page up, the system pages up the document, as indicated at block 715. Paging user input may be given using keyboard page buttons or graphical controls. If, as determined at block 717, the user input is page down, the system pages down the document, as indicated at block 719.

Figure 8:
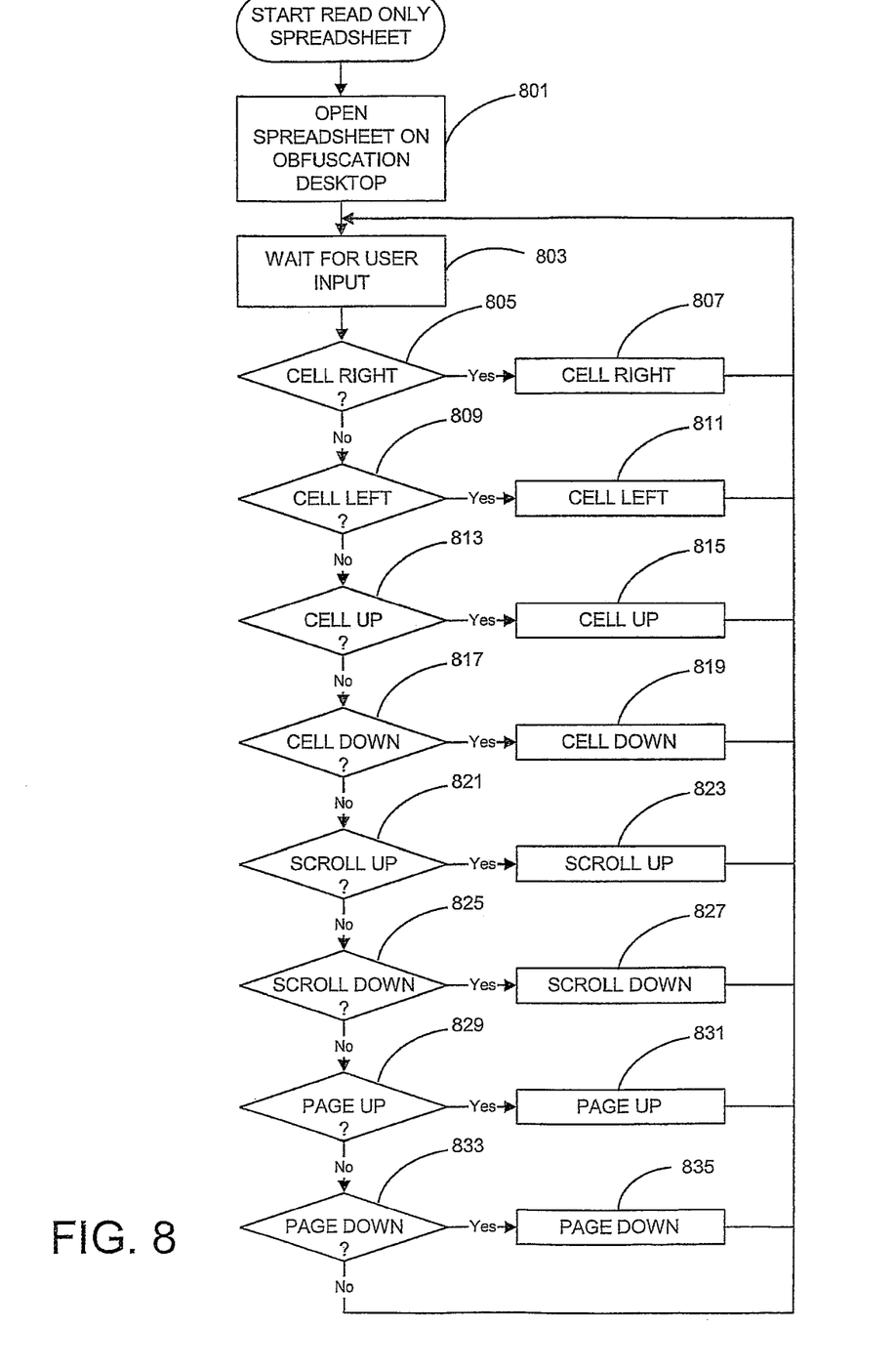
FIG. 8 is a flow chart of an embodiment of read only obfuscation spreadsheet processing according to the present invention.

FIG. 8 is a flow chart of read-only spreadsheet processing according to the present invention. The system opens a spreadsheet on the obfuscation desktop, at block 801, and waits for user input at block 803. If the user input, as determined at decision block 805, is cell right, the system moves the highlighted cell right, as indicated at block 807. If, as determined at decision block 809, the user input is cell left, the system moves a highlighted cell left, as indicated at block 811. If, as determined at decision block 813, the user input is cell up, the system moves the highlighted cell up, at block 815. If, as determined at decision block 817, the user input is cell found, the system moves the highlighted cell down, as indicated at block 819. If, as determined at decision block 821, the user input is scroll up, the system scrolls of the spreadsheet displayed on the obfuscation desktop up, as indicated at block 823. If, as determined at decision block 825, the user input is scroll down, the system scrolls the spreadsheet down, as indicated at block 827. If, as determined at decision block 829, user input is page up, the system pages the spreadsheet displayed on the obfuscation desktop up, as indicated at block 831. If, as determined at decision block 833, the user input is page down, the system scrolls the spreadsheet down, as indicated at block 835.

Figure 9:
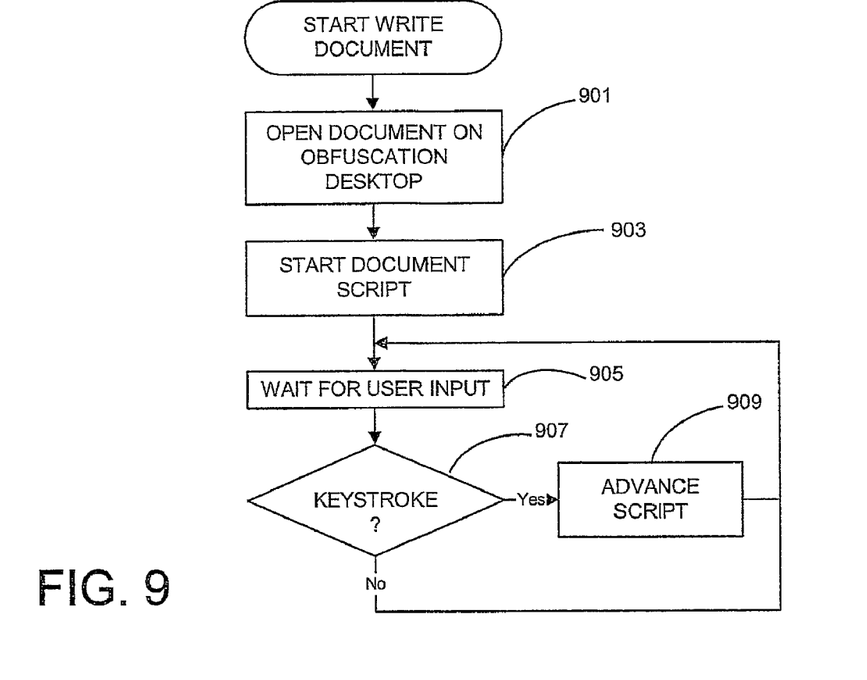
FIG. 9 is a flow chart of an embodiment of obfuscation document write processing according to the present invention.

FIG. 9 is a high-level flowchart of write document processing according to an embodiment of the present invention. The system opens a document on the obfuscation desktop, at block 901. According to an embodiment of the present invention, a script may be prepared for entering text into the document opened on the obfuscation desktop in response to keyboard input from the user. The system starts the document script, at block 903, and waits for user input, at block 905. If, as determined at decision block 907 the user input is a keystroke, the system advances the script, as indicated at block 909. Advancing the script causes a character, a punctuation mark, a space, a carriage return, or the like, to appear on the document displayed on the obfuscation desktop.

Figure 10:
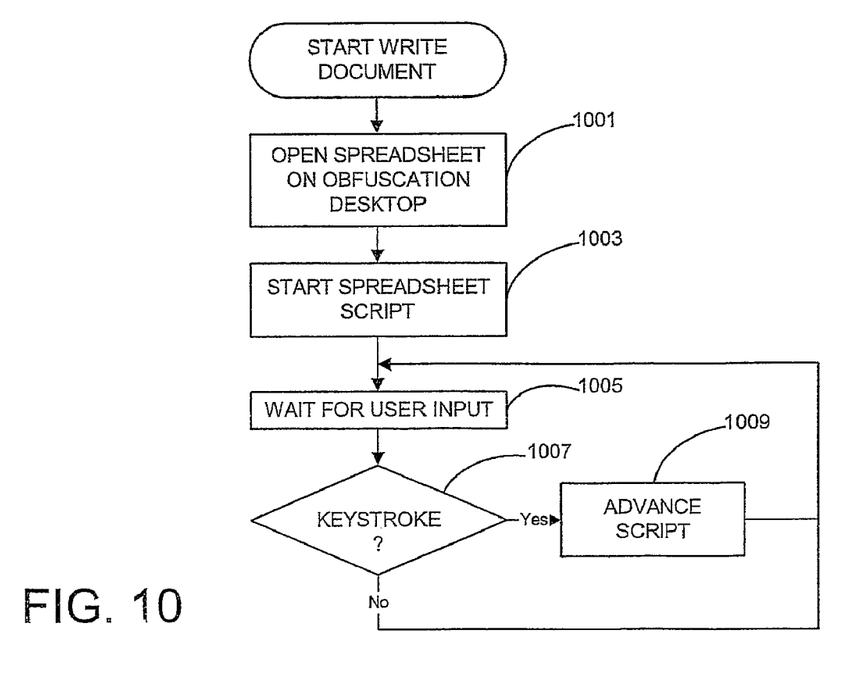
FIG. 10 is a flow chart of an embodiment of obfuscation spreadsheet write processing according to the present invention; and, FIG. 11 is a block diagram of an information handling system adapted to practice embodiments of the present invention

FIG. 10 is a high-level flowchart of write document processing according to an embodiment of the present invention. The system opens a spreadsheet on the obfuscation desktop, at block 1001. According to an embodiment of the present invention, a script may be prepared for entering text or numbers into the spreadsheet opened on the obfuscation desktop in response to keyboard input from the user. The system starts the spreadsheet script, at block 1003, and waits for user input, at block 1005. If, as determined at decision block 1007 the user input is a keystroke, the system advances the script, as indicated at block 1009.

Figure 11:
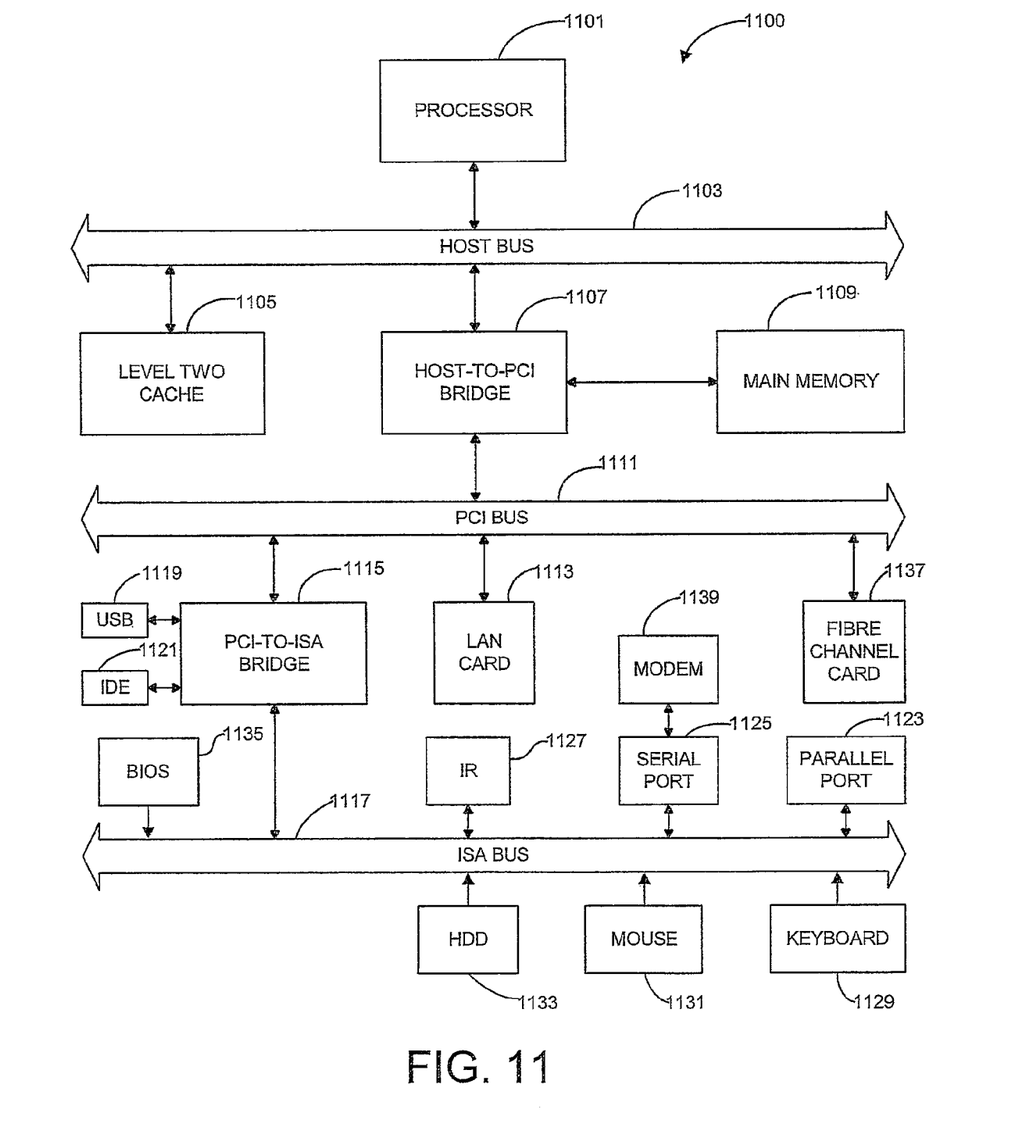

Referring now to FIG. 11, there is illustrated a block diagram of a generic information handling system 1100 capable of performing the server and client operations described herein. Computer system 1100 includes processor 1101 which is coupled to host bus 1103. Processor 1101 preferably includes an onboard cache memory. A level two (L2) cache memory 1105 is also coupled to host bus 1103. A Host-to-PCI bridge 1107 is coupled to host bus 1103. Host-to-PCI bridge 1107, which is coupled to main memory 1109, includes its own cache memory and main memory control functions. Host-to-PCI bridge 1107 provides bus control to handle transfers among a PCI bus 1111, processor 1101, L2 cache 1105, main memory 1109, and host bus 1103. PCI bus 1111 provides an interface for a variety of devices including, for example, a local area network (LAN) card 1113, a PCI-to-ISA bridge 1115, which provides bus control to handle transfers between PCI bus 1111 and an ISA bus 1117, a universal serial bus (USB) 1119, and an IDE device 1121. PCI-to-ISA bridge 1115 also includes onboard power management functionality. PCI-to-ISA bridge 1115 can include other functional elements not shown, such as a real-time clock (RTC), DMA control, interrupt support, and system management bus support.

Peripheral devices and input/output (I/O) devices can be attached to various interfaces or ports coupled to ISA bus 1117. Such interfaces or ports may include a parallel port 1123, a serial port 1125, an infrared (IR) interface 1127, a keyboard interface 1129, a mouse interface 1131, and a hard disk drive (HDD) 1133.

A BIOS 1135 is coupled to ISA bus 517. BIOS 1135 incorporates the necessary processor executable code for a variety of low-level system functions and system boot functions. BIOS 1135 can be stored in any computer readable medium, including magnetic storage media, optical storage media, flash memory, random access memory, read only memory, and communications media conveying signals encoding the instructions (e.g., signals from a network). In order to couple computer system 1100 to another computer system to copy files or send and receive messages over a network, LAN card 1113 may be coupled to PCI bus 1111. Similarly, a Fibre Channel card may be coupled to PCI bus 1113. Additionally, a modem 1139 may be coupled to ISA bus 1117 through serial port 1125 to support dial-up connections.

While the computer system described in FIG. 11 is capable of executing the invention described herein, the illustrated system is simply one example of a computer system. Those skilled in the art will appreciate that many other computer system designs are capable of performing the invention described herein.

One of the preferred implementations of the invention is an application, namely, a set of instructions (program code) in a code module that may, for example, be in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method of preventing viewing by bystanders of information displayed on a display screen, which method comprises:
   simultaneously displaying, on a display screen having a first viewing angle and a second viewing angle, an active image and an obfuscating image, said active image being visible from said first viewing angle and invisible from said second viewing angle, and said obfuscating image being invisible from said first viewing angle and visible from said second viewing angle;

wherein simultaneously displaying said active and obfuscating images comprises:
   interlacing said active and obfuscating images; and
   displaying said interlaced active and obfuscating images on said display screen;

receiving user input;

displaying a result of said user input in said active image; and displaying a result of said user input in said obfuscating image.

2. The method as claimed in claim 1, wherein:
said active image comprises a private document; and
said obfuscating image comprises a public document.

3. The method as claimed in claim 1, wherein:
said result displayed in said active image comprises actual user input; and
said result displayed in said obfuscating image comprises simulated user input.

4. The method as claimed in claim 1, wherein:
said active image comprises a first document and said obfuscating image comprises a second document.

5. The method as claimed in claim 4, wherein said simultaneously manipulating said active and obfuscating images comprises:
simultaneously scrolling said first and second documents.

6. The method as claimed in claim 4, wherein said simultaneously manipulating said active and obfuscating images comprises:
simultaneously accepting keyboard input to said first and second documents.

7. A computer system, which comprises:
a display screen, said display screen having a first viewing angle and a second viewing angle;
a display mechanism for displaying simultaneously on said display screen an active image and an obfuscating image, said active image being visible from said first viewing angle and invisible from said second viewing angle, and said obfuscating image being visible from said second viewing angle and invisible from said first viewing angle, wherein said displaying simultaneously on said display screen an active image and an obfuscating image comprises interlacing said active image and said obfuscating images and displaying said interlaced active and obfuscating images on said display screen;
a user input device operatively coupled to said display screen; and
said display mechanism simultaneously manipulating said first and second images in response to actuation of said user input device.

* * * * *